United States Patent [19]
Shimizu et al.

[11] Patent Number: 4,587,178
[45] Date of Patent: May 6, 1986

[54] MAGNETIC RECORDING MEDIUM

[75] Inventors: Shigeo Shimizu, Yokohama; Toshio Kato, Yamato; Hitoshi Oda, Yokohama; Masanobu Shigeta, Isehara, all of Japan

[73] Assignee: Victor Company of Japan, Ltd., Japan

[21] Appl. No.: 401,967

[22] Filed: Jul. 26, 1982

[30] Foreign Application Priority Data

Jul. 27, 1981 [JP] Japan .................. 56-116474

[51] Int. Cl.$^4$ .............................. H01F 10/02
[52] U.S. Cl. .................. 428/615; 428/336; 428/621; 428/624; 428/626; 428/678; 428/900; 428/928
[58] Field of Search .............. 428/928, 900, 336, 615, 428/621, 624, 626, 678; 427/127–132

[56] References Cited

U.S. PATENT DOCUMENTS 4,371,590 2/1983 Izumi et al. .................. 428/928

Primary Examiner—Bernard D. Pianalto
Attorney, Agent, or Firm—Lowe, Price, Leblanc, Becker & Shur

[57] ABSTRACT

A magnetic recording medium comprising a support, a first layer formed on the support by evaporating cobalt or its alloy by an oblique-incidence vacuum evaporation technique, and a second plated layer made of cobalt or its alloy and formed by a wet plating. The cobalt alloy for the first layer substantially consists of, aside from cobalt, up to 30 wt % of Ni, Fe, Cu, W, Cr, Ru or a mixture thereof. On the other hand, the cobalt alloy for the second layer substantially consists of up to 40 wt % of Ni, up to 8 wt % of P and the balance of Co.

11 Claims, No Drawings

MAGNETIC RECORDING MEDIUM

BACKGROUND OF THE INVENTION

1. Field of the Invention

This invention relates to the recording art and more particularly, to magnetic recording media including various tapes such as video, audio and memory tapes, and other magnetic articles such as magnetic discs, cards and the like.

2. Description of the Prior Art

In magnetic recording media having thin magnetic recording layers of magnetic materials such as cobalt, the thin magnetic layer is usually formed by either a wet method such as electroplating, electroless plating or the like, or a dry method such as vacuum evaporation, sputtering, ion plating or the like. These two types of the methods have the respective advantages as follows. The wet method is advantageous in that the thin magnetic layer is high in reproducibility of magnetic characteristics and the thin magnetic media have, in some cases, a coercive force (Hc) as high as about 1,500 Oe with a good distribution of the coercive force (Hc). That is, the thin layer obtained by the wet method has such a feature that in the magnetization curve, when the magnetic field at a point where a tangent at or near Hc in the curve meets with a residual magnetism Mr is taken as $H^*$, the coercive squareness $H^*/Hc=S^*$ is relatively high. This high coercive squareness $S^*$ leads to the high recording sensitivity (i.e. playback output potential/recording current) with the high playback potential. Accordingly, the magnetic media having such a thin magnetic layer obtained by the wet method exhibit good sensitivity when applied as recording and reproducing media. Moreover, the wet method is advantageous, for example, over a vacuum evaporation technique in that formation of the thin magnetic layer entails little loss of magnetic materials and that a thin magnetic medium having a thin magnetic layer of a given thickness can simply be fabricated. However, it has the disadvantage that the thin magnetic layer formed by the wet method is isotropic in nature in the plane of the layer, so that a residual magnetization to saturation magnetization ratio (Rs) becomes small. In contrast, the thin magnetic film or layer formed by the dry method and particularly by an oblique-incidence vacuum evaporation technique is imparted with the uniaxial magnetic anisotropy with a relatively high Rs ratio and also with the coercive force Hc as high as about 3,000 Oe. However, the evaporation method has the drawback that a quantity of an evaporated material such as Co on a support or base is small relative to a quantity of an evaporated source material with a substantial loss of the evaporated material, leading to high production costs. Moreover, the distribution of the coercive force Hc is so large that the $S^*$ value becomes small, resulting in the poor sensitivity when the thin film-type magnetic media made by the evaporation method are used as a recording and reproducing medium. To increase a thickness of the vacuum-evaporated thin magnetic layer for ensuring a satisfactory output potential results in a lowering of magnetic characteristics and particularly in a poor Rs value.

An attempt has been made to overcome the drawbacks of the oblique-incidence vacuum evaporation technique to an extent or to improve the productivity, in which attempt, for example, a base film wound about a roller is subjected first to the vacuum evaporation at a high incident angle and then to the vacuum evaporation at a low incident angle while the roller is rotated in the latter evaporation step. However, by this method is not improved the productivity so far, and the vacuum evaporation at small angles results in a decreasing constant of uniaxial magnetic anisotropy (Ku), coupled with further disadvantages that an angle is established between an axis of easy magnetization and the plane of the layer and that the value $S^*$ becomes small. Moreover, if the vacuum evaporation is effected in an atmosphere containing a very small amount of oxygen gas so as to reduce the lowering of Hc owing to the increasing amount of the component formed by the low angle vacuum evaporation, this in turn leads to the disadvantage of reducing the saturation magnetization.

SUMMARY OF THE INVENTION

It is accordingly an object of the present invention to provide a magnetic recording medium which has a magnetic layer substantially composed of two types of layers formed by different techniques by which magnetic characteristics including the uniaxial magnetic anisotropy constant Ku are much improved.

It is another object of the invention to provide a magnetic recording medium which is fabricated economically because of the reduced loss of starting materials for the magnetic layers.

It is a further object of the invention to provide a magnetic recording medium which has a magnetic recording layer composed of an undercoat of cobalt or its alloy formed by an oblique-incidence vacuum evaporation and a top coat of cobalt or its alloy formed by a wet plating whereby the vacuum evaporation can be effected even in an atmosphere containing oxygen gas in very small amounts with little reduction of saturation megnetization.

The above objects can be achieved, according to the invention, by a magnetic recording medium which comprises a support, a first layer having a thickness of 5 to 5,000 Å and made of cobalt or its alloy containing up to 30 wt % of at least one metal selected from the group consisting of Ni, Fe, Cu, W, Cr and Ru and the balance of cobalt, the first layer being formed on one surface of the support by an oblique-incidence vacuum evaporation, and a second layer having a thickness of about 200 to 25,000 Å and made of cobalt or a cobalt alloy containing up to 40 wt % of Ni and up to 8 wt % of P, the second layer being formed on the first layer by a wet plating technique. As mentioned above, the cobalt or cobalt alloy for the first layer containing up to 30 wt % of the above-defined metals is first vacuum-evaporated on a support by an oblique vacuum evaporation method in which the starting cobalt or alloy thereof is evaporated at a certain incident angle, with respect to the support, ranging from 10° to 90° in a given thickness within the defined range. This first layer serves as the so-called undercoat for the second layer. The second layer is formed on the first layer by a wet plating technique such as electroplating, electroless plating or the like. In order to improve the resistances to corrosion and abrasion, the second layer may be incorporated with at least one metal such as Mn, W or Zn in an amount not greater than 10 wt % of the total of the metal materials used.

The above and other objects and advantages of the present invention will become apparent from the following description.

DETAILED DESCRIPTION OF THE INVENTION

The supports for the magnetic media of the invention are those ordinarily employed for the magnetic recording media and include, for example, films of organic polymers such as polyesters, polyimides and the like, glass plates, sheets or foils of aluminium plated with Ni-P alloys or Ni-W-P alloys thereon.

On the support is formed a layer of cobalt or its alloy by an oblique-incidence evaporation method. The thickness of the deposited layer is not critical but if the thickness is less than about 5 Å, or is too small, the crystal structure cannot be formed in the layer. On the other hand, when the layer is too thick, there arises the problem of lowering the productivity. Accordingly, the thickness of the layer is generally in the rane of about 5 to 5000 Å preferably 50 to 500 Å. The film or layer formed by the vacuum evaporation in a predetermined thickness involves therein an axis of easy magnetization parallel to the incident direction of the evaporation. Accordingly, it is preferable to determine the incident direction of the evaporation so that it conforms to the direction of magnetic recording of the media.

The cobalt alloys useful for the undercoat layer include alloys of up to 30 wt % of a metal such as Ni, Fe, Cu, W, Cr, Ru or a mixture thereof and the balance of Co. Of these alloys, the Co-Ni alloy is preferably used.

After formation of the first layer in a predetermined thickness, cobalt or its cobalt alloy is formed in a predetermined thickness by an ordinary wet plating technique on the first layer. In order to impart to the plated magnetic layer execellent magnetic characteristics, e.g. the coercive force and residual flux, the thickness of the plated layer is generally in the range of 200 to 25,000 Å, preferably 500 to 3,000 Å.

The magnetic layer formed on a support is made of two types of the layers formed by the oblique-incidence vacuum evaporation and wet plating according to the invention has the advantage that the uniaxial magnetic anisotropy constant Ku and the coercive squareness S* are more improved than in the case of known magnetic recording media using either plated or evaporated magnetic layer. This is believed for the following reason: the plated layer grows based on the anisotropy of the crystals of cobalt or its alloy in the evaporated undercoat layer. In this sense, it is important for the evaporated undercoat layer to have the anisotropic, crystalline component in the layer but the thickness and magnetic characteristics of the layer are not rather important. Accordingly, not only cobalt but also the cobalt alloys such as Co-Ni, Co-Fe, Co-Cu, Co-W, Co-Cr, Co-Ru and the like are usable as the evaporating source for the oblique-incidence vacuum evaporation as mentioned hereinbefore.

The second layer is formed by any known wet plating techniques such as electroplating, electroless plating and the like. These techniques are well known in the art and are not described in detail herein. The suitable metals used for making the layer are cobalt and its alloy. The alloys have compositions of up to 40 wt % of Ni, up to 8 wt % of P and the balance of Co. That is, the Co alloy including the single use of Co has a composition of 0 to 40 wt % of Ni, 0 to 8 wt % of P and the balance of Co.

In order to improve resistances to corrosion and abrasion, the wet plating can be conducted using a plating bath having a metallic component such as Mn, W, Zn or a mixture thereof. These metals do not adversely affect on the plate magnetic layer with respect to their magnetic characteristics such as Ku, S* and the like. These metal components are generally added in an amount not greater than 10 wt % of the total metal composition.

The present invention is more particularly described by way of examples and comparative examples.

EXAMPLES 1 THROUGH 9

An about 0.2 mm thick copper plate was polished on the surface thereof by an ordinary polishing machine and subjected to pretreatments such as electrolytic cleaning and acid neutralization, followed by electroless nickel plating to form an about 0.2 to 0.5 microns thick film of a now magnetic Ni-P alloy (having a phosphorus content of 8 to 10 wt %) on the surface of the copper plate, thereby obtaining a substrate.

The substrate was placed in a vacuum evaporator and subjected to the oblique-incidence vacuum evaporation cobalt by application of an electron beam under conditions of a vacuum of about $10^{-4}$ to $10^{-5}$ torr. and an incident angle of 10° to 80° thereby forming an evaporated Co layer on the substrate surface in a given thickness. After formation of the evaporated Co layer, the substrate was removed from the evaporator and then immersed in a Ni-Co-P electroplating bath having the following composition.

| | |
|---|---|
| $NiCl_2.6H_2O$ | 60 g/l |
| $CoCl_2.6H_2O$ | 180 g/l |
| $NaH_2PO_2.H_2O$ | 4 g/l |
| $NH_4Cl$ | 50 g/l |

Then, an ordinary wet plating was conducted under conditions of a bath temperature of 24° C. and a current density of 1 A/dm$^2$ while adjusting the pH to 4.0 by the use of HCl and NH$_4$OH thereby forming a plated film layer of a predetermined thickness on the evaporated layer. In these examples, the incident angle, the degree of vacuum for the evaporation, the evaporated layer thickness and the plated layer thickness were changed as indicated in Table.

EXAMPLE 10

Examples 1 through 9 were repeated using an electroplating bath having the following composition.

| | |
|---|---|
| $NiCl_2.6H_2O$ | 120 g/l |
| $CoCl_2.6H_2O$ | 120 g/l |
| $NaH_2PO_2.H_2O$ | 4 g/l |
| $NH_4Cl$ | 50 g/l |

As a result, a magnetic recording medium having thicknesses of the respective layers as indicated in Table was obtained.

EXAMPLE 11

Examples 1 through 9 were repeated using an electroplating bath having the following composition and electroplating conditions, thereby obtaining a magnetic recording medium.

| Bath Composition | |
|---|---|
| $CoCl_2.6H_2O$ | 240 g/l |
| $NaH_2PO_2.H_2O$ | 20 g/l |
| $NH_4Cl$ | 50 g/l |
| $H_3BO_3$ | 10 g/l |

-continued

| Plating Conditions | |
|---|---|
| pH | 3.5 |
| Bath Temperature | 24° C. |
| Current Density | 2 A/dm$^2$ |

EXAMPLE 12

Examples 1 through 9 were repeated using an electroless plating bath having the following composition and electroless conditions thereby obtaining a magnetic recording medium.

| Bath Composition | |
|---|---|
| CoSO$_4$.7H$_2$O | 30 g/l |
| Na$_3$C$_6$H$_5$O$_7$.2H$_2$O | 35 g/l |
| NaH$_2$PO$_2$.H$_2$O | 20 g/l |
| (NH$_4$)$_2$SO$_4$ | 66 g/l |
| Electroless Conditions | |
| Bath Temperature | 80° C. |
| pH (at 50° C.) | 8.7 |

COMPARATIVE EXAMPLE 1

A rolled copper plate which had been polished on the surface thereof was subjected to ordinary electrolytic cleaning and acid neutralization treatments, followed by electroless nickel plating and washing sufficiently with water. This plated copper plate was then immersed in an electroplating bath of the following composition under conditions as indicated below to form an about 0.72 microns thick Ni-Co-P plated layer thereby obtaining a magnetic recording medium.

| Bath Composition | |
|---|---|
| NiCl$_2$.6H$_2$O | 60 g/l |
| CoCl$_2$.6H$_2$O | 180 g/l |
| NaH$_2$PO$_2$.H$_2$O | 4 g/l |
| NH$_4$Cl | 50 g/l |
| Electroplating Conditions | |
| pH (adjusted with HCl or NH$_4$OH) | 4.0 |
| Bath Temperature | 24° C. |
| Current Density | 1 A/dm$^2$ |

COMPARATIVE EXAMPLE 2

Comparative Example 1 was repeated using, instead of the Ni-Co-P electroplating bath, a Co-P electroplating bath of the following composition and conditions, thereby obtaining a magnetic recording medium.

| Bath Composition | |
|---|---|
| CoCl$_2$.6H$_2$O | 240 g/l |
| NaH$_2$PO$_2$.H$_2$O | 20 g/l |
| NH$_4$Cl | 50 g/l |
| H$_3$BO$_3$ | 10 g/l |
| Electroplating Conditions | |
| pH | 3.5 |
| Bath Temperature | 24° C. |
| Current Density | 2 A/dm$^2$ |

COMPARATIVE EXAMPLE 3

Comparative Example 1 was repeated using, instead of the Ni-Co-P electroplating bath, an electroless Co-P plating bath of the following compositions and plating conditions, thereby obtaining a magnetic recording medium.

| Bath Composition | |
|---|---|
| CoSO$_4$.7H$_2$O | 30 g/l |
| Na$_3$C$_6$H$_5$O$_7$.2H$_2$O | 35 g/l |
| NaH$_2$PO$_2$.H$_2$O | 20 g/l |
| (NH$_4$)$_2$SO$_4$ | 66 g/l |
| Plating Conditions | |
| Bath Temperature | 80° C. |
| pH (at 50° C.) | 8.7 |

COMPARATIVE EXAMPLE 4

A rolled copper plate which had been polished on the surface thereof was subjected to ordinary electrolytic cleaning and acid neutralization treatments, followed by electroless nickel plating. This substrate was placed in a vacuum evaporator in which cobalt was evaporated under a degree of vacuum of $1-10 \times 10^{-5}$ torr. at an incident angle of 70° by application of an electron beam thereby obtaining a magnetic recording medium having an about 0.61 microns thick evaporated film thereon.

COMPARATIVE EXAMPLES 5-11

The general procedure of Examples 1 through 9 was repeated except that different evaporating source metals as indicated in Table were used and the bath composition for the Ni-Co-P electroplating and the plating conditions were substantially the same as used in the Examples as follows.

| Bath Composition | |
|---|---|
| NiCl$_2$.6H$_2$O | 60 g/l |
| CoCl$_2$.6H$_2$O | 180 g/l |
| NaH$_2$PO$_2$.H$_2$O | 4 g/l |
| NH$_4$Cl | 50 g/l |
| Plating Conditions | |
| pH | 4.0 |
| Bath Temperature | 24° C. |
| Current Density | 1 A/dm$^2$ |

The magnetic recording media obtained in the foregoing exmples and comparative examples were subjected to measurements of their physical and magnetic characteristics by the following methods.

Measurement of Magnetic Characteristics

1. Magnetization Curve

Each sample was punched into a disc with an outer diameter of 10 mm and this disc was used to measure its magnetization curve by means of a vibrating sample magnetometer (VSM-3S, Made by Toei Ind. Co., Ltd.) at a maximum applied magnetic field of 10 KOe. The coercive force Hc, squareness Rs, and value S* were calculated from the magnetization curve.

2. Measurement of Magnetic Anisotropy

The samples as used in the measurement of the magnetization curve were each used to measure its torque curve by the use of the torque meter (MT-1A, made by Shimadzu Seisaku-sho K.K.) for measuring the magnetic anisotropy at a maximum applied magnetic field of 10 KOe.

The direction of the axis of easy magnetization was determined from the torque curve and the uniaxial anisotropy constant Ku was calculated from an amplitude of the torque curve at 10 KOe.

Measurement of Layer Thickness

1. Thickness of Wet Plating

A part of the plated layer was dissolved in about 1.5N $HNO_3$ solution and the thickness of the layer was measured using a surface roughness tester (Talysurf 10, made by Taylor & Hobson Co., Ltd.)

2. Thickness of Evaporated Layer (a) Co

The thickness was determined from saturation magnetization and area of a sample.

(b) Other Metals (Cu, Zn, Sn, Ti, Cr, Mn, etc.)

The thickness was determined by a thickness monitor using a crystal resonator which is based on the fact that vibrations vary depending on a variation of a mass on the surface.

The results of the above measurements are summarized in Table below.

TABLE

| | Evaporating Material | Incident Angle (degree) | Degree of Vacuum ($\times 10^{-5}$ torr.) | Thickness of Evaporated Layer (microns) | Thickness of Wet Plating (microns) |
|---|---|---|---|---|---|
| Examples | | | | | |
| 1 | Co | 10 | 2 | 0.09 | 0.72 |
| 2 | Co | 50 | 2 | 0.056 | 0.72 |
| 3 | Co | 60 | 2 | 0.103 | 0.72 |
| 4 | Co | 70 | 8 | 0.060 | 0.72 |
| 5 | Co | 80 | 2 | 0.036 | 0.75 |
| 6 | Co | 80 | 2 | 0.009 | 0.75 |
| 7 | Co | 80 | 2 | 0.036 | 2.50 |
| 8 | Co | 80 | 2 | 0.036 | 0.25 |
| 9 | Co | 80 | 1 | 0.100 | 0.27 |
| 10 | Co | 80 | 6 | 0.030 | 0.24 |
| 11 | Co | 80 | 1-2 | 0.030 | 0.25 |
| 12 | Co | 80 | 5 | 0.030 | 0.17 |
| Comparative Examples | | | | | |
| 1 | — | — | — | — | 0.72 |
| 2 | — | — | — | — | 0.72 |
| 3 | — | — | — | — | 0.51 |
| 4 | Co | 70 | 1-10 | 0.61 | — |
| 5 | Cu | 80 | 1 | 0.1 | 0.24 |
| 6 | $Cu_{0.6}$—$Zn_{0.4}$ | 80 | 5 | 0.1 | 0.24 |
| 7 | Zn | 80 | 2 | 0.22 | 0.24 |
| 8 | Sn | 80 | 8 | 0.15 | 0.24 |
| 9 | Ti | 80 | 5 | 0.1 | 0.24 |
| 10 | Cr | 80 | 1-2 | 0.1 | 0.24 |
| 11 | Mn | 80 | 2 | 0.15 | 0.24 |

| | Ku ($\times 10^5$ erg/cc) | Direction of Easy Axis | | Br (gauss) | Direction of Hard Axis | | Coercive Squareness S* |
|---|---|---|---|---|---|---|---|
| | | Hc(Oe) | Rs | | Hc(Oe) | Rs | |
| Examples | | | | | | | |
| 1 | 1.0 | 450 | 0.65 | 9600 | 475 | 0.57 | 0.80 |
| 2 | 3.1 | 392 | 0.68 | 10000 | 455 | 0.55 | 0.84 |
| 3 | 3.8 | 515 | 0.70 | 10300 | 500 | 0.49 | 0.84 |
| 4 | 11.0 | 488 | 0.81 | 11100 | 540 | 0.36 | 0.97 |
| 5 | 18.6 | 595 | 0.86 | 12700 | 610 | 0.28 | 0.97 |
| 6 | 10.0 | 615 | 0.74 | 10500 | 640 | 0.42 | 0.98 |
| 7 | 18.5 | 477 | 0.83 | 11900 | 570 | 0.22 | 0.98 |
| 8 | 16.7 | 752 | 0.89 | 12600 | 490 | 0.28 | 0.98 |
| 9 | 20.1 | 960 | 0.90 | 12300 | 760 | 0.32 | 0.98 |
| 10 | 17.0 | 1025 | 0.86 | 12100 | 880 | 0.41 | 0.99 |
| 11 | 16.0 | 792 | 0.86 | 12200 | 690 | 0.36 | 0.98 |
| 12 | 12.0 | 592 | 0.85 | 12000 | 250 | 0.28 | 0.92 |
| Comparative Examples | | | | | | | |
| 1 | 0.0 | 500 | 0.48 | 7200 | — | — | 0.64 |
| 2 | 0.0 | 710 | 0.44 | 6600 | — | — | 0.56 |
| 3 | 0.0 | 330 | 0.54 | 8100 | — | — | 0.78 |
| 4 | 9.0 | 1000 | 0.77 | 11600 | 550 | 0.30 | 0.15 |
| 5 | 3.0 | 580 | 0.60 | 8600 | 630 | 0.49 | 0.60 |
| 6 | 1.2 | 695 | 0.56 | 8300 | 685 | 0.53 | 0.77 |
| 7 | 0.4 | 950 | 0.48 | 7060 | 950 | 0.48 | 0.54 |
| 8 | 0.7 | 850 | 0.54 | 8000 | 850 | 0.54 | 0.72 |
| 9 | 0.2 | 935 | 0.54 | 7900 | 935 | 0.54 | 0.59 |
| 10 | 1.5 | 1270 | 0.43 | 6300 | 1270 | 0.43 | 0.26 |
| 11 | 0.0 | 690 | 0.63 | 9400 | 690 | 0.63 | 0.30 |

Note (1)
The wet platings in Examples 1-10, Example 11 and Example 12 were, respectively, the electroplating of Ni—Co—P, electroplating of Co—P, and electroless plating of Co—P.

Note (2)
The magnetic recording media obtained in all the comparative examples had the easy axis in a direction meeting at a right angle with the incident direction of evaporating atoms except the media of comparative examples 4 and 11, the former medium having the evaporated layer of Co alone and the latter medium using Mn whose Ku value was zero, as seen from the table. On the contrary, the media obtained in Examples of the invention had an easy axis parallel to the incident direction.

As will be apparent from the above results, the magnetic recording media of the invention which have two magnetic thin Co-base layers superposed first by the oblique-incidence vacuum evaporation and then by the wet plating exhibit high values of coercive force Hc, residual magnetic flux density Br, squareness Rs, and coercive squareness S* are thus more excellent in magnetic characteristics than the media of Comparative Examples. In the media of the invention, the magnetic layer has such an easy axis as to be arranged parallel to the incident direction of evaporated atoms from the oblique-incidence vacuum evaporation, so that when the media are applied so as to make the axis parallel to the recording direction, the surface recording density is advantageously improved with a much improved S/N ratio. Thus, the media of the invention are particularly suitable for use in high density recording. Moreover, especially when the incident angle is in the range of over 70 degree, inclusive, the value Ku is as high as about in the order of about $10^6$ erg/cc. In all the cases, the coercive squareness S* is much higher than all the media obtained in Comparative Examples. Accordingly, the magnetic media of the invention show more excellent sensitivity when used as a recording and reproducing medium.

With thin magnetic media obtained by a mere plating technique, the Hc value is about 600 Oe and Rs value is about 0.55 at a thickness of the magnetic layer of 0.26 microns. When the layer thickness increases, for example, to 2.5 microns, the Rs value is lowered to about 0.45. In contrast, the superposed magnetic layer of the invention shows an Hc value of about 750 Oe and a Rs value of about 0.89 at a thickness of about 0.29 microns and when the thickness is increased up to about 2.5 microns, the Rs value is about 0.83. Thus, the magnetic characteristics of the magnetic layer of the invention are not lowered so much with an increase of the layer thickness. It will also be found that the constant Ku is not greatly influenced by the change in thickness of the plated layer.

Upon comparing the magnetic characteristics of Examples 1 through 12 with those of Comparative Examples 5 through 11, the use of evaporating metals themselves other than cobalt will be found to be much less effective though part of cobalt may be replaced by other metals.

EXAMPLE 13

Example 10 was repeated using as an evaporating source Co-Ni alloys having 10 wt % and 30 wt % of nickel, respectivly. As a result, substantially the same results as in Example 10 were obtained in both cases.

Similar results were also obtained using, instead of nickel, iron, copper, tungsten, chromium and ruthenium.

EXAMPLE 14

Example 10 was also repeated except that cobalt was vacuum-evaporated in an atmosphere containing a very small amount of oxygen gas, with similar results.

EXAMPLE 15

Example 8 was repeated using a plating bath of the same composition as indicated in Examples 1 through 8 but 0.05 mol/l of manganese chloride, 0.05 mol/l of sodium tungstate and 0.01 mol/l of zinc chloride were, respectively, added to the composition. The same magnetic characteristics as in Example 8 were obtained, and these media were improved in resistances to abrasion and corrosion over the medium of Example 8.

EXAMPLE 16

The general procedure of Example 8 was repeated to give a magnetic disc having an easy axis along its circumference except that cobalt was vacuum-evaporated in a thickness of 0.03 microns on which the Ni-Co-P alloy was plated in thickness of 0.24 microns.

The resulting magnetic disc had a Hc value of 600 Oe, a squareness Rs of 0.88, and a coercive squareness S* of 0.98.

For comparison, the above procedure was repeated except that the undercoat was not applied thereby obtaining a magnetic disc. This disc had a Hc value of 700 Oe, a squareness Rs of 0.60 and a coercive squareness S* of 0.70. The plated layer had a thickness of 0.24 microns.

These magnetic discs were each subjected to the measurement of an electromagnetic conversion characteristic in which a Mn-Zn ferrite magnetic head (gap width: 0.7 micron, tracking width: 55 microns, flying height: 0.15 micron) was used at a relative speed between the magnetic disc and the magnetic head of 18.9 m/sec. It was found that the magnetic disc according to the invention showed a remarkable increase in output level over a wide frequency range, e.g. by 5 dB at a low range of 1 MHz and by 2.5 dB at a high range of 7 MHz.

Moreover, the recording sensitivity and erasing characteristic were also improved.

What is claimed is:

1. A magnetic recording medium comprising a support, a first layer having a thickness of 5 to 5000 Å and made of cobalt or a cobalt alloy containing up to 30 wt % of at least one member selected from the group consisting of Ni, Fe, Cu, W, Cr, and Ru and the balance of cobalt, said first layer being formed on one surface of said support by an oblique-incidence vacuum evaporation, and a second layer having a thickness of 200 to 25,000 Å and made of cobalt or a cobalt alloy containing up to 40 wt % of Ni and up to 8 wt % of P, said second layer being formed on said first layer by electroplating or electroless plating.

2. A magnetic recording medium according to claim 1, wherein said first layer is made of cobalt.

3. A magnetic recording medium according to claim 1, wherein said first layer is made of the cobalt alloy.

4. A magnetic recording medium according to claim 3, wherein said cobalt alloy of said first layer is a Co-Ni alloy.

5. A magnetic recording medium according to claim 1, wherein said second layer is made of cobalt.

6. A magnetic recording medium according to claim 1, wherein said second layer is made of the cobalt alloy.

7. A magnetic recording medium according to claims 1 or 6, wherein the cobalt alloy for said second layer further comprises up to 10 wt % of at least one member selected from the group consisting of Mn, W and Zn whereby resistance to corrosion and abrasion are improved.

8. A magnetic recording medium according to claim 1, wherein the cobalt or its alloy for said first layer is evaporated at an incident angle, with respect to the support, of over 70°, inclusive.

9. A magnetic recording medium according to claim 1, wherein the thickness of said first layer is in the range of 50 to 500 Å.

10. A magnetic recording medium according to claim 1, wherein the thickness of said second layer is in the range of 300 to 5,000 Å.

11. A magnetic recording medium according to claim 1, wherein said medium has a recording and reproducing direction parallel to an axis of easy magnetization of a magnetic layer composed of the first and second layers.

* * * * *